Jan. 20, 1953   W. M. SUBLETTE   2,625,840
AUTOMATIC DIFFERENTIAL GEAR TRANSMISSION
Filed Oct. 18, 1949   4 Sheets-Sheet 4

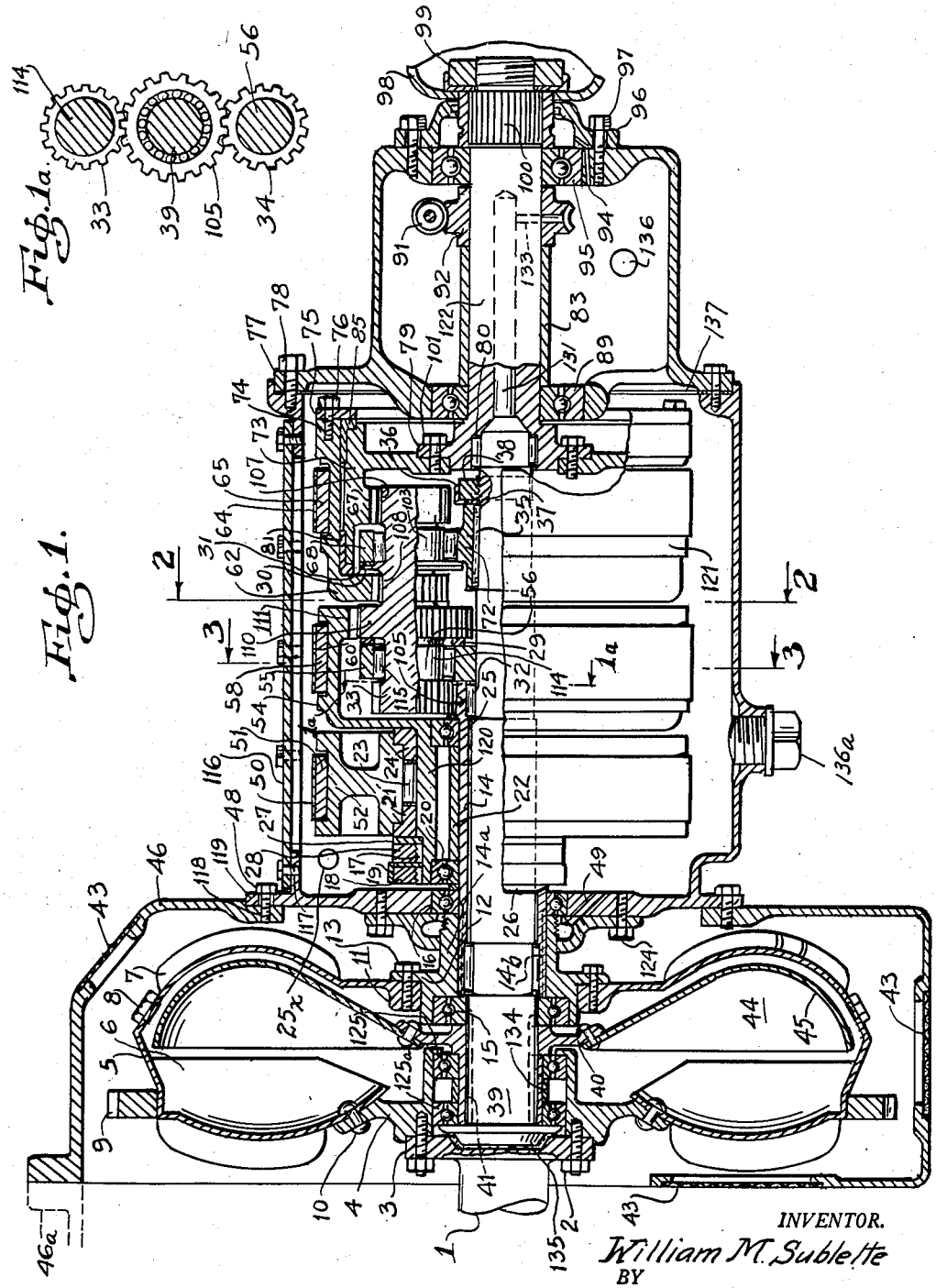

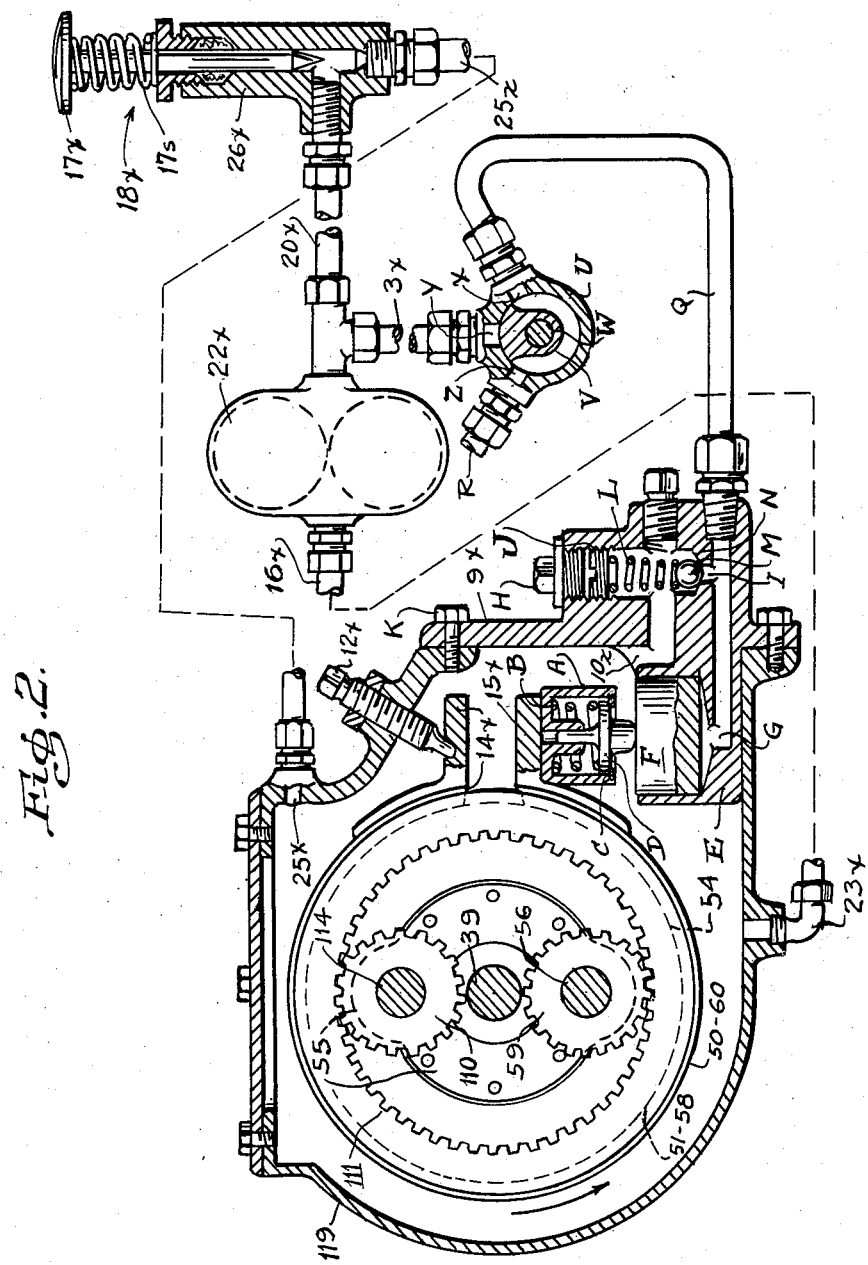

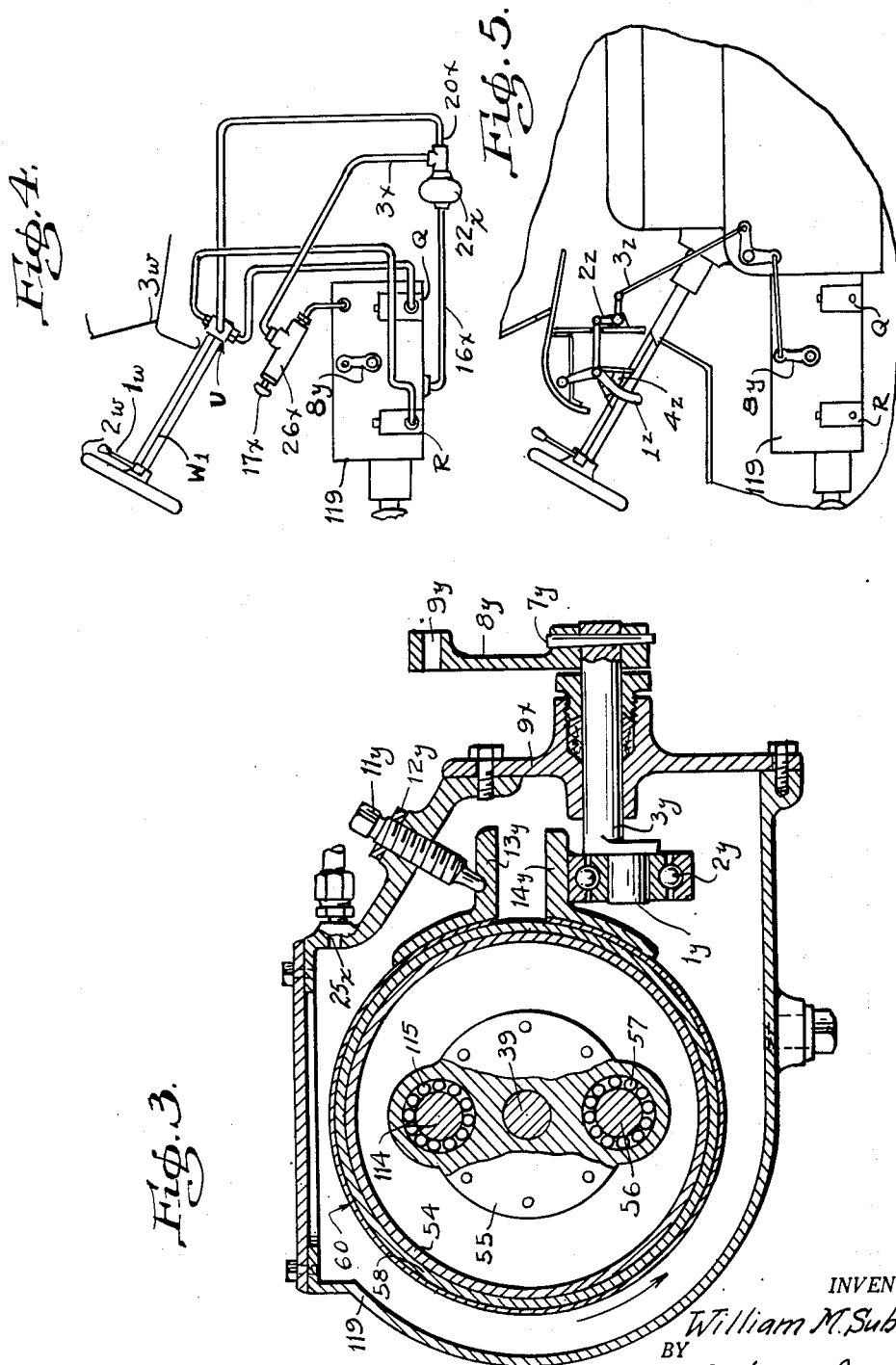

Fig. 6.

INVENTOR.
William M. Sublette
BY
Robt. W. Pearson
ATTORNEY

UNITED STATES PATENT OFFICE 2,625,840

AUTOMATIC DIFFERENTIAL GEAR TRANSMISSION

William M. Sublette, Monrovia, Calif.

Application October 18, 1949, Serial No. 122,114

7 Claims. (Cl. 74—731)

This invention relates to a hydraulic automatic differential gear transmission for self-propelled vehicles.

Among the objects of the invention are to provide, for self-propelled vehicles, a power transmission means which eliminates conventional gears and housings and also avoids the expense of making automatic equipment, such as governors and electric circuits for controls and timing equipment.

Additional objects pertain to the provision of better safety factors for parking and for down grade hold-back control.

Also, other objects are to secure desired functioning with a simplified construction that is more convenient to maintain in a satisfactory operating condition wherein smoothness of operation is obtained at all times, and power changes are more easily effected.

By this invention there is maintained a uniform, balanced condition between the engine torque and the applied load at all the speeds of the vehicle up to the locking or synchronous speed of the impeller and runner of the fluid drive. The point of synchronous rotation of engine in relation to the load is determined by the fluid drive member and gear ratio. In heavier vehicles such as trucks, tractors, motor busses and diesel trains a lower gear ratio is used; the synchronous speed of the impeller and runner can be determined to suit the performance desired.

That end of the housing structure which is adjacent to the engine or other prime mover is connected to any suitable stationary mounting member.

Other objects, advantages and features of invention will hereinafter appear.

Referring to the accompanying drawings, which illustrate a preferred embodiment of the invention, Fig. 1 is a longitudinal, vertical midsection of a power transmission mechanism embodying the invention, some interior parts being shown either fragmentarily or completely in side elevation.

Fig. 1a is a sectional view on line 1a—1a of Fig. 1.

Fig. 2 is a cross section on line 2—2 of Fig. 1, with additional cooperating parts shown partly in section and partly in elevation.

Fig. 3 is a cross section on line 3—3 of Fig. 1.

Fig. 4 is a side elevation of a part of the manual control means, parts being omitted for clearness of illustration, and the piping associated with said means being included in the view.

Fig. 5 is a side elevation of the manual control means, parts of which are not shown in Fig. 4 being included.

Fig. 6 is a complete longitudinal midsection of the power transmission, shown in Fig. 1.

Referring in detail to the drawings, and more particularly to Fig. 1, in association with the engine shaft 1 are shown bolts 2 securing the engine flange 3 to the fluid coupling 4, which is cylindrically shaped, and fitted with the ball bearings 125 and 125a. Member 5—6 is the driving member of the fluid coupling or automatic speed changer. Members 7 are the cooling blades of the fluid unit and 8 are the drain and filler plugs. Member 9 is the starter ring gear and 10 are rivets holding the driving member 5 to the hub 4. Member 11 is a ring shaped portion welded to the driving member 5 for the cap screws 13 to screw into. Member 12 is a flanged portion of the cylindrical shaft 14a. Members 13 are cap screws for fastening the driving member 5 to a flange 12. Member 14 is the cylindrical shaft or main direct drive shaft from the engine to the planetary unit. Member 15 is a ball bearing supporting the driven shaft 39 in the cylindrical shaft 14a and member 16 is a ball bearing supporting the cylindrical shaft 14 in the transmission housing 119.

Member 17 is a slot in the hub of the ring gear 111 to secure the locking washer 19 in place. Member 18 is a nut to secure the band drum 52 on the hub 120 and at the same time to allow the drum 52 to revolve upon said hub. Member 19 is a locking washer to secure the nut 18 to said hub. Members 20 and 25 are ball bearings for supporting the band drum 54 and ring gear 111 upon the cylindrical shaft 14. Members 21 and 24 are bronze bushings supporting the band drum 52 upon the hub 120 and allowing the drum 52 to revolve around the hub 120. Member 22 is a spacer between the bearings 20 and 25.

Members 23 are the free wheeling rollers of the free wheeling unit which operate in the automatic release from the low gear range to the higher gear ranges, this unit being incorporated into the drum 52 where they serve to allow relative rotation in one direction only between said drum and the tubular hub 120 of the adjacent drum 54. Member 26 is a spacer between the bearings 16 and 20. Member 27 is a thrust collar and 28 is an adjusting nut which is tight against nut 18. Member 29 is a thrust washer for the gear 110, and 30 is a thrusting flange for the gear unit shaft 103. Members 32 are the pin roller bearings for supporting the cylindrical shaft 14 upon the shaft 39. Members 33 and 34 are two planetary gears in mesh with the sun gear 105. Member 35 is a shaft key to keep hub 72 secured on the shaft 39, and member 36 is a locking washer for nut 38. 37 is a slot in the small portion of the shaft 39 for securing said locking washer 36 in place. Member 38 is the nut for securing the hub 72 in place, which is a part of the planetary unit housing, to the small end of the shaft 39. Said member 39 is the driven shaft to which the driven member of the fluid coupling is fastened at one end and to which the hub of the planetary unit 45 is fastened at the other end. The two ball bearings 125 and 125a are mounted upon this hub and in turn mounted in the cylindrical hub 4. Members 41 designates the splines in the hub 40 and on the shaft 39. The blades 44 are mounted upon support 45 which are riveted to the aforesaid hub 40 of the driven unit. The fluid unit is ventilated by screened ports 43. The housing 46 of the fluid unit is attached by cap screws 48 to a flanged part of the housing 119 which houses the planetary combination unit. An oil drain-back channel or slot 49 leads downwardly into said housing. Member 50 is the spring metal backing of the automatic low gear drum band to which is fastened the brake band material. Member 52 is the automatic low gear range drum which is hydraulically controlled. Member 54 is the mechanically operated low gear drum for going down steep grades and for parking the car. A hand lever is fastened under the dash on the right side of the steering column similar to the emergency hand lever on conventional cars.

Member 55 is a mounting and housing for the planetary gears 59, 63, 66, 34 and 110, 108, 107 and 33. Members 56 and 70 are the shafts for the planetary gears 59, 63, 66, 34 and 57, and 71 is a pin roller bearing mounted in the planetary gear housings 55 and 68 for the shafts 56 and 70 to revolve upon. Member 58 is the brake band material fastened to 60 which is mounted in the mechanically operated low gear range drum 54. Member 59 is one of the low planetary gears. Member 60 is a spring steel back to which the brake material 58 is fastened. Member 62 is the reverse internal ring gear and 63 is the reverse planetary gear. Member 64 is the spring back of the reverse band. Member 65 is the brake material which is fastened to member 64, and these members 64 and 65 operate on the reverse drum 121. Member 66 is a planetary gear meshing with the internal ring driven-gear 67, and which is an extension of the planetary gear 34. Member 67 is the direct driven internal gear to which power from both sources, such as from the positive direct low gear and from the combination of variable speeds derived through the effect of the fluid unit and the planetary gears, is constantly being applied in variable measures from low gear continuously up to and including the high or direct drive. Member 68 is a mounting or support and housing for the planetary gears 59, 63, 66 and 34; and 110, 108, 107 and 33. Member 31 is the thrust washer between 30 and housing 68. The shaft 70 has been mentioned with member 56. Members 71 are the pin bearings, which have been mentioned with member 57. Member 72 is the hub or mounting for the planetary housings 55 and 68 and is fastened on the shaft 39 at its farthest end. Member 73 is the drum of which the main driven internal ring gear 67 is a part, and is secured to the flange 79. Member 74 is a part of the internal reverse ring gear 62 and 75 is a thrust collar fastened to 74.

Members 74 and 75 are secured together by cap screws 76. Member 77 is an extension of the planetary gear housing 119, and 78 are the cap screws for fastening these two housings together. Member 79 is a flanged part of shaft 122 to which the drum 73 is bolted. Members 80 are the pin roller bearings allowing the shaft 39 to revolve in the shaft 122. Members 81 and 85 are bronze bearings which are installed on the drum 73 and allow it to turn in the drum 74. Member 83 is a spacer on the shaft 122 between the bearing 89 and the speedometer gear 92. Member 89 is a ball bearing mounted on shaft 122 and in the housing 77.

Member 91 is the worm gear for the speedometer drive and 92 is the driving gear cooperating with the said worm gear. 94 is an oil drain-back channel leading into the housing 77. Member 95 is a ball bearing mounted in the housing 77 and on the shaft 122. Member 96 is a bearing cap, retaining cap or cover. Members 97 are the cap screws for holding the cover 96 onto the housing 77. Member 98 is the connector to the automobile propeller shaft. Member 99 is the nut that secures, under tension, the parts 83, 89, 92, 95 and 98 on the shaft 122 against the flange part 79. Member 100 shows the spline-part on which the member 98 is mounted. Members 101 are the cap screws for fastening the flange 79 to the drum part 73. Members 102 and 115 are pin roller bearings which are mounted in the planetary gear housing 55 and 68. Members 103 and 114 are the shafts for the planetary gears 107, 108, 110 and 33 and turn in the pin bearings 102 and 115. Member 105 is the sun gear which the two planetary gears 33 and 34 revolve around, it is also the direct low-gear. Members 107 and 66 are similar functioning gears, being an extension of the planetary gears 33 and 34 respectively. Member 111 is the internal low ring gear. Member 110 is the same in description as member 59.

In Fig. 1, 32 shows the pin bearings for supporting the cylindrical shaft 14 upon the shaft 39, to which the driven member of the fluid coupling or automatic speed changer is fastened at one end and to which the hub of the planetary unit is fastened at the other end.

Referring now more particularly to Figs. 2 and 3, the planetary gears 110 and 59 are respectively mounted on shafts 114 and 56, 55 designating one half of the planetary housing, in Fig. 3, 115 and 57 designating roller bearings. Members 59 and 110 are the low speed planetary gears, and 111 being the internal low speed ring gear.

In Fig. 2 the hydraulically operated low gear band 51 is shown just behind a fragment of the mechanically operated low gear band 58.

Within the small cylindrical housing A is a spiral compression spring B engaging a guided plunger D which is limited in its downward movement by a lock washer C which keeps the spring under proper tension. An open-topped housing E supports and guides a hydraulically operated piston F that operates on the plunger D, oil under pressure being supplied beneath said piston by an inlet passage G.

On the interior of the housing 119 oil flows through a passage 10x through port I and from said passage G. Said port is thus guarded by a ball check valve M, yieldingly held down to the seat N by a spiral compression spring L the upper end of which abuts an adjustable screw plug J. A removable, screwthreaded plug H closes the top of the bore which contains said plug J. Hence access may be had to the screw plug J so as to adjust it to cause the spring L and valve M to bypass the oil at the proper operating pressure for the low gear band 51 when the oil pressure becomes high enough to overcome the compression of spring L, the valve M then opening and allowing the oil to flow from said passage G. The plate 9x is held to the housing 119 by cap screws K.

By suitable fittings a pipe Q is installed to conduct the oil from a selector housing U to that end of the aforesaid passage G which is farthest from the housing which contains the piston F, a port X leading into said pipe from said housing U, and a pipe R leading from the opposite side of said housing to the reverse drum 121.

The selector valve V is fixed to the rod W which leads to the selector lever mounted on the steering wheel. Port Z of casing U communicates with the aforesaid pipe R, and the valve plug V is shown in neutral position closing a port Y that communicates with a pipe 3x which leads into a pipe 20x one end of which communicates with a pressure pump 22x and the opposite end of which communicates with the casing 26x of the control pedal unit.

Returning to the control pedal unit 26x, said unit contains a needle valve control means 18x to control the flow of oil therethrough, said means carrying a low gear pedal 17x operable by the foot of the driver against the opposition of a spiral compression spring 17s underlying said pedal.

Member 9x is the plate to which all the band mechanisms are connected, said plate being secured to the housing by cap screws as shown. The band 14x is adjusted by screws 12x, there being one of these screws for the low gear mechanically operated band 58, one for the hydraulically operated low gear band 51, and one for the reverse hydraulically operated gear band 65, each one having a suitable lock nut. Member 14x is the upper bracket of the lower gear band 50, 51 and 15x is the lower bracket of said band.

Member 23x is the connection leading into the bottom of the oil supply in the housing 119, this connection communicating with the pipe 16x of the pump 22x.

Describing parts not already mentioned, shown in Fig. 3, 1y designates a part of the eccentric shaft 3y within a ball bearing 2y, this ball bearing being used as a cam to apply the low speed gear band 58; said shaft 3y being mounted in the already mentioned plate 9x. Lever 8y is secured to the shaft 3y by a pin 7y, said lever being connected at 9y to a hand lever under the dash or instrument panel. Member 11y designates the adjusting screw for the band 58—60, held in place by a lock nut 12y. Member 13y designates the bracket of the low gear band 58—60 and 14y the lower bracket of said low gear band.

In Fig. 4 the steering wheel 2w carries a hand lever 1w to operate the selector unit U, the rod W1, actuated by said lever, being connected with said unit. The windshield is designated 3w. The parts designated Q and R have already been mentioned, also the pump diagrammatically indicated at 22x and pipes 3x and 16x thereof. The selection of the position of the oil transmission connection on the housing 119 is a matter of choice. Member 9y designates the mechanical low gear lever, and 20x the connection or inlet for bypassing oil coming from the central unit 26x which unit is furnished with the foot pedal 17x.

In Fig. 5 a few parts are shown which have not yet been mentioned, among them the levers 1z, 2z and 3z, 1z being the hand lever for applying the pressure on the mechanical low gear band 58. A ratchet lever 4z holds the lever 1z in position, for example, when going down steep grades or for parking in low gear. The lever 9y and foot pedal 17x have already been mentioned; also the reverse gear pipe unit R and low gear pipe unit Q, both of said units being hydraulically operated.

It will be observed that this invention includes a gear system which includes sun and planet gears which are housed in a cylindrical rotatable housing, said housing being the planet carrier of the planet gears, which are located within and controlled by a plurality of brake drums. Also, with said gear system and housing is associated a power take off shaft which is axially alined with said cylindrical housing and to one end of which is concentrically fixed the output annulus or ring gear.

The transmission is composed of the fluid unit which has a very important part in the functioning of this transmission. Then there is the low gear combination which starts with the sun gear 105, then to the two planetary gears 33 and 34 which are actuated directly from the engine through the housing 5 and the sleeve shaft 14. The automatic low gear band 50, 51 is engaged on the drum 52 by pushing down on the pedal 17x (Fig. 2) stopping said drum. The oil pump 22x which is turning at engine speed is taking in oil through the pipe 16x, and when the hand lever is put in low gear position on the steering column, the port Z in unit selector U is closed and the port Y is open as is also port X which is the low gear port. As the pedal 17x is pushed down oil will stop by-passing around through the pipe line 25x into the transmission housing 119 and will now go through the port X through the pipe Q and thence on into the channel G thus forcing the piston F up against the tension loaded spring and engage the low gear band 51 around the drum 52, and after pressure is reached beyond what is needed, the by-pass valve M will open up and let the flow of oil go into the channel 10x back into the housing 119, and then the motion of this drum 52 is stopped. In doing this the free wheeling rollers 23 engage the hub 120 which is a part of the low gear drum 54 and to which is attached the low gear internal ring gear 111. This ring gear is now motionless and this causes the planetary gear assembly, which is fastened to the shaft 39, to revolve in the direction the engine is turning. Also the driven member 44, 45 of the fluid coupling is attached and mounted on this shaft 39 through the splined connection 41, and this shaft 39 is also being actuated at the same time by the driving member 5—6 energizing the driven member 44, 45 through its oil medium or fluid. As soon as the driving member 5—6 and the driven member 45 begin power transmission the low gear drum 52 releases and free wheels and, owing to the planet carrier 55 for the planet gears being fixed to the fluid driven shaft 39, said planet carrier is actuated by the driver member 5—6 and is forced to turn, and is forced to turn in the same direction as the engine is turning, and when the operator's foot is taken off the pedal 17x the low gear drum 51 revolves with the rest of the unit of which it forms a part, as will be more clearly understood from the description and explanation which follow. Now, the planet gears 66 and 107 which are attached to the same shaft that the planet gears 33 and 34 are attached to and which are being actuated by the gear 105 at the same time as the planet carrier 55, are engaging the output annulus or internal ring gear 67—106. The two gears 66 and 107 are doing a double purpose function, as the planet gears 33 and 34 are turning in opposite direction of the engine it also causes the planet gears 66 and 107 to turn in the opposite direction and in doing so the output annulus or internal ring gear 67—106 will move in the opposite direction to the engine rotation. This movement in the opposite direction of engine rotation is calculated to delay the output annulus enough to gain an added revolution or part of a revolution of the engine and at the same time to give a proper gear ratio for the reverse gear using the same gears for reverse and for forward direct low and also for giving a right combination of gear ratio for the increasing power of the engine torque from two to three to four times as would be chosen by the manufacturer. In this instance it is increased about three times so that it parallels the positive low gearing when it is applied as stated, in the previous description, when the low gear drum 52 is stopped from rotating when the band 51 is applied. Now, when the low gear drum 52 is stopped the planet gears 59 and 110 which are approximately twice the size in pitch diameter as the two gears 33 and 34 and mounted on the same shafts 70 and 103, respectively, will rotate around on the inside of the annulus or internal ring gear 111 in the same direction of rotation as the engine and about twice as fast as the two gears 33 and 34 would if they were turning inside of the stationary annulus. For example, if the sun gear 105 had 30 teeth and the planet gears 33 and 34 each had 15 teeth and these two gears were forced around on the inside of a 60 tooth annulus, then the sun gear would turn three times to the planet carrier's once. Therefore as the drawing shows the two gears 59 and 110 being on the same shafts as 33 and 34 and with twice as many teeth as 33 and 34, or 30 teeth, the sun gear 105 would turn approximately one and one-half times to the planet carrier's once, so with the planet gears 66 and 107 turning the annulus gear 106 in reverse direction enough so that the engine would turn another one and one-half revolutions then there would be a three to one ratio in low. In other words the sun gear 105 would turn three times and the output annulus 106 would turn once, therefore at the same time this is going-on the driver members 5 and 6 are driving the driven members 44 and 45. As the automobile gains momentum in direct low gear, as described, the torque increases between the members 5 and 6, and 44 and 45 and keeps on increasing, and at the same time decreasing in torque in the direct low gearing and finally the torque gets so low on the low gear and the torque gets so great on the high gear range, or between members 5 and 6, and members 44 and 45, that the so called driver member 5—6, and the driven member 44—45 take over, that is the engine torque is now passing through the driver and driven members and not through the direct low gear stage as when first starting, at this point the drum 52 is free wheeling on the rollers 23 and 53 instead of being clutched by them when the direct low is engaged. As the engine idles at 450 R. P. M., for example, then that will mean the sun gear will turn at 450 R. P. M., and the planet carrier is turning at 150 R. P. M., and as this is attached to the driven fluid members 44 and 45 and the driver member 5—6 which is attached to the sun gear 105, is turning three times and the driven member 44—45 turns once or one time, this would mean that the engine has three times more torque than if the driver member of the fluid coupling was coupled direct from the engine and the driven member of the fluid coupling was direct on the output shaft. As for an example take an automobile with the engine turning up to 750 R. P. M. with full open throttle and the automobile has just come to a stall on a grade. Then in this case the driver member of the fluid coupling is turning at 750 R. P. M. and the driven member of the fluid coupling which is attached to the output shaft is motionless, and the full output of the engine is being used at this stage without causing any motion to the automobile. Whereas in the last recited case if the transmission was in the place of a standard type of transmission, as it was in the above case, there would be an entirely different ratio of performance. For the car to come to a stall as in the above recited instance, there would have to be an approximated 750 R. P. M. difference between the driver and driven members of the fluid unit, the driven member 44—45 turning 375 R. P. M. and the driving member 5—6 turning at 1125 R. P. M. and as the transmission has a three to one torque conversion or three to one reduction in the sun and planetary gears the engine would be turning 1125 R. P. M., and if the engine's greatest horse power is given at 3600 R. P. M., then there would be 2475 R. P. M. more that the engine can turn to get to its greatest horsepower. So then every added revolution per minute that is made by the engine the output shaft will turn one-third of that amount of speed, so then if the rear end of the automobile is geared 3.54 to one, then approximately every 410 R. P. M. that is added on top of the 1125 R. P. M. the engine was making when it stalled with partly opened throttle the automobile will gain three and one-third miles per hour. So when the engine is turning 3600 R. P. M. the automobile will be going approximately twenty miles per hour instead of being in a stalled position, and if the motor can still increase its R. P. M. the automobile will go that much faster in proportion.

As can be seen in the above description the automatic principle in this transmission is in direct proportion to the load that is applied to the output shaft, the engine's revolutions controlled by the throttle and the clutching effect between the driver and driven members of the fluid unit in combination with a geared down planetary unit whereas the amount of torque conversion to be chosen depends upon the gear ratio in the planetary unit as chosen.

Furthermore to operate the above condition backward, where the automobile is traveling up a grade at twenty miles per hour with mostly an open throttle, as can be seen the driver and driven members of the fluid unit are gripping or clutching but slipping by each other and they can not slip any more than the gear ratio of the planetary gears.

As said grade continuously gets less steep with the same amount of throttle at all times throughout this operation, the planetary gears will begin to turn less and the slippage will become less between the driver and driven members in the fluid unit, as the gripping condition or clutching condition in the fluid unit stays about the same intensity at all times with the same amount of throttle; then as the grade gets less and less and finally the road becomes level then the driven member gradually catches up with the driver member of the fluid unit and the planetary gears turn slower and slower and finally almost stop turning when the driver and driven members become (so-called) locked but not actually completely locked, as there is a very slight slippage, and by this time the automobile is traveling a very rapid speed. Therefore, when the conditions are such that the driver and driven members of the fluid unit slip in relation to themselves it is because an added load is being applied on the output shaft. The automatic principle of the transmission is in action right at this point because, when the driver and driven members of the fluid unit slip in relation to each other, then the geared down planetary unit starts to function and allows the engine to speed up, increasing the engine's torque in relation to the load that is being added on to the output shaft. The ratio being approximately 2.700, the engine turns 2.7 times to 1 turn of the driven ring gear 106 and therefore the main shaft 122 will turn only once also. Up in the fluid unit the driver member 5—6 is turning 3 turns to one turn of the driven member 44, 45, and as the speed of the engine increases the car is picking up speed in low gear and also the driven member 44—45 of the fluid unit is becoming more energized by the driver 5, and as soon as the driven unit 44 and 45 increases just a little above 3 to 1 ratio (right then) the load has shifted from the planetary gears 33 and 34 and the sun gear 105, from a forward pushing effort to pulling retarding effort, which therefore, is caused by the driven member of the fluid unit in catching up with the driver member. This causes a reverse action of the drum 52, and the free wheeling rollers will now start turning, as the drum 54 now turns in a reverse direction to that which it would have turned if the free wheeling unit had not taken hold; and the drum 54 now starts to turn in the same direction as the main driving drum 73 is turning, which is forward, the same direction as the engine is turning. As the automobile gains momentum and has finally reached the momentum the driver wishes, for example 35 miles per hour, the driven and driver units of the fluid coupling will each be going about the same speed. This is called a locked position, for the transmission has reached the high stage. At this stage all motion or turning of the planetary sun and ring gears in themselves is practically eliminated and the whole unit turns in a locked position. From the time the load has shifted from the sun gear and until the transmission has reached its high gear stage there is a variable speed changing taking place with no jerks or manual operation of any kind. This is caused by the driven member 44—45 gradually catching up with the driver member 5, this performance being throughout the entire range from starting position in low gear to the transmission's highest gear ratio.

If the operator is approaching a long, steep grade at 55 or 60 miles an hour at full open throttle and the grade becomes steeper, the fluid coupling will begin to slip enough to allow the engine to pick up enough speed to increase its horsepower and still maintain close to the 55 miles an hour speed. Of course there is a limit as to horsepower and speed, so if the grade gets so steep that the transmission will slip back into low gear and if the driver realizes that beforehand, all he has to do is to press down on the pedal 17x, and when the time comes the transmission will slip back into low gear without the slightest jerk or vibration of any kind. The automobile driver can take his foot off from the pedal 17x as soon as he reaches 20 or 25 miles per hour in normal driving speed, or 35 or 40 miles per hour in hard wide open throttle performance from a standing start, or sooner if desired, which will have to be determined by actual automobile performance and testing.

By using an efficient fluid coupling as is used on some of the present popular automobiles the loss would be in about the same proportion, only instead of a two per cent slip at full open throttle at 30 miles per hour or over, it would be a two per cent slippage at full open throttle at perhaps 55 miles an hour or over and from 30 miles an hour up to 55 miles an hour in every day driving would not be much more than two per cent slippage, if any, as the throttle is not fully open at these speeds, so it would have high efficiency. All mountain driving would be automatically taken care of for the best performance. The automobile load will always be adjusted for the correct engine speed and torque due to the differentiating function of the planetary gear unit in combination with the fluid coupling.

To start the car the operator does not have to press down on the pedal 17x, but all that he has to do is to press on the throttle and the automobile is set into motion. The increased engine torque for starting the vehicle without using direct low gear and by using the same gear combination is accomplished as follows: with the low brake bands in off position and engine turning or idling the drum 54 is now rotating in reverse direction and the output annulus 106 is stationary. The sun gear 105 is turning three times, the planet carrier 55 and 68 is turning over approximately one turn or the same ratio as the direct low as stated in the above three to one ratio, and as the sun gear 105 turns the planet gears 33 and 34 are forced to turn, and being attached to the planet gears 66 and 107 by the shaft 56 and 114, will turn in the annulus 106 in the opposite direction of rotation to that of the sun gear 105. Also, as the annulus 106 is attached to the output shaft 122, said shaft being at rest will cause the planet carrier 55—68 to rotate in the same direction as the sun gear 105. As the throttle is opened an increased slippage per minute between the driver member 5—6 and the driven member 44—45 is taking place, creating a clutching effect between the two members and when the clutching effect becomes sufficient the automobile will start moving. As the throttle is opened more and more the clutching effect becomes more intensified because the rate of slippage between the driver and driven members is increased per minute in the fluid unit, and as the planetary unit is a three to one gear ratio and the engine can turn three revolutions to one of the output shaft 122 the automobile has a very "snappy get-away." As the driven member 44—45 gradually catches up with the driver member 5—6, the transmission gradually changes from low gear to high and the engine's speed gradually decreases from three to one to one to one and so-called locks in high. The transmission can always be put in high after acceleration by releasing and holding the throttle at whatever speed the operator chooses. The driver can use this performance for slow driving or in the city with all the traffic, and possibly for most of his driving, but if he prefers quicker response he immediately has his automatic low speed by pressing down on the pedal 17x, and this will make a very convenient and pleasant combination for driving the automobile.

For reversing the automobile the driver simply shifts the hand lever on the steering column to the reverse position When this is done the valve V is rotated around, thus closing the low gear port X and operating the reverse gear member Z and also member Y, so that when the pedal 17x is pressed down it closes off the free flow through the pipe line 25x and starts the oil flow around through the selector V through the pipe R and thence to the reverse mechanism, which is identical with the low gear mechanism; and this, in turn, clamps the band 65 tightly around the reverse drum 121, causing it to become stationary, and this, in turn, causes the reverse planetary gears 63 and 108 to start to pull themselves around on the inside of the internal gear 62, which starts the planetary unit to revolve in the direction of the engine. But the planetary gears 66 and 107, being larger will force the driven internal gear 67—106 in the reverse direction, which will give the proper reverse gear ratio and will start the automobile to moving backward, and will stop it as soon as the foot is released from the pedal 17x.

Easy, soft and smooth performance when starting the automobile is derived when the pedal 17x is pressed down as slowly as he wishes, and there will be no grabbing or chattering unless the pedal 17x is pushed down too quickly. When starting forward from a standing position on a steep grade, the driver is feeding a little throttle and is holding the automobile, and if he wishes a quick get away he will push down on the pedal 17x, at the same time opening the throttle. This will take the load away from the second stage and place it correctly on the first stage, direct low, and then the automobile will automatically shift into high through the transmission. As described in the above, the driver can take his foot off from the pedal 17x any time he feels so inclined after the twenty miles an hour is reached, if not pushing the car too hard. This hold back by the transmission in the second stage and picked up by the first stage for a quick getaway makes driving very convenient.

The operation of the mechanical low gear is very simple which makes this convenient transmission an extra safety means for the driver. When the operator is driving down a very steep grade, for double safety he can pull on the lever 1z under the instrument board on the right side and the low gear band 58 is immediately clamped tightly around the drum 54 thus engaging the planetary low gears, as was accomplished when they were engaged by the pedal 17x, hydraulically, on drum 52. By pulling said lever under the instrument panel the lever 8y (Fig. 3) is energized and it turns the shaft 3y and also the ball bearing cam 1y, 2y up against the band bracket 14y, which clamps the band 58 on the drum 54. This engages the low planetary gears and causes the engine to turn over faster, thus holding the automobile back from too much down grade speed.

Said lever 1z under the instrument panel is a ratchet type, and when parking the car on a grade the driver pulls this lever out, which will engage the gears for holding the automobile stationary. Besides this holding means the driver may also put on the parking brakes which is always customary.

The central shaft 39 has been described as a fluid driven shaft but it will be seen that, during the reverse gear operation and also during certain low gear operations, this shaft functions only as a mounting means which rotatably supports the planetary gear carrier. The planetary gears 33 and 34 constitute a driven set of gears, for they are driven by the sun gear 105, whereas the remaining planetary gears may appropriately be called driving planetary gears because, in certain operations, they drive around in the surrounding internally gear toothed members.

I claim:

1. In a hydraulic automatic differential gear transmission for self-propelled vehicles, a tubular planetary gear housing, a fluid driven shaft located axially within said housing, an engine driven sleeve shaft surrounding that end portion of said fluid driven shaft which is adjacent to the engine, a power transmission with variable speed means interposed between said fluid driven shaft and sleeve driven shaft, a power take-off shaft mounted adjacent to and in axial alinement with that end portion of said fluid driven shaft which is farthest from the engine, a planetary gear system positioned to transmit power from said sleeve shaft to said power take-off shaft, said gear system including sun and planetary gearing; said sun and planetary gearing including a drum having internal teeth in mesh with said planetary gear system and having a tubular hub surrounding said sleeve shaft in a rotatable relation to the latter, said hub being directed toward the engine and being located between the latter and the planetary gear wheels, a low gear drum surrounding said hub in a radially spaced relation thereto, a set of free wheeling rollers within said low gear drum in a surrounding relation to said hub so that said drum can rotate with said hub in one direction only; an additional drum having internal teeth in mesh with said planetary gearing and combined manual and automatic speed regulating means including braking means for all of said drums to regulate their rotation and thus control the travel of the planetary gears around said fluid driven shaft, said regulating means having operating connections that extend through that end portion of said tubular housing which is adjacent to the engine.

2. The subject matter of claim 1, and said set of planetry gears consisting of a plurality of diametrically opposite gear units each of which gear units is an axially elongated integral multiple gear having gear toothed portions of different diameter, and another internally toothed drum surrounding and in mesh with one set of the gear elements of said multiple gears, said last mentioned drum being secured axially to and forming a continuation of one end portion of said power take-off or main drive shaft.

3. In a hydraulic automatic differential gear transmission for self-propelled vehicles, a tubular planetary gear housing, a fluid driven shaft located axially within said housing, a sleeve shaft surrounding that end portion of said fluid driven shaft which is adjacent to the engine, a power take-off shaft rotatably mounted in axial alinement with that end portion of said fluid driven shaft which is farthest from the engine, one end of said power take-off shaft projecting into the adjacent end portion of the aforesaid housing, an internally gear toothed drum within the latter end portion of said housing and rotatable in relation thereto, said drum being at one end secured to said power take-off shaft, an epicyclic gear system positioned around said fluid driven shaft to transmit power from said sleeve shaft to said power take-off shaft, said gear system including a sun gear fixed to said concentrically fixed power driven shaft and sets of planetary gears, the gears of one of said sets meshing with the teeth of said internally toothed drum, said gear system including a planetary gear carrier fixed to said fluid driven shaft and a set of planetary gear shafts to each of the shafts of which is fixed a gear of each of said sets of planetary gears, additional drums surrounding said epicyclic gear system and located between the aforesaid first recited drum and that end portion of said fluid driven shaft which is nearest to the engine, said additional drums having internal gear teeth meshing with gears of said system, and independent braking means for each of said drums, the gears of a set of the planetary gears which meshes with one of said drums differing in diameter from the gears of a set of the planetary gears which meshes with another of said drums.

4. In an automatic differential gear transmission, a fluid driven shaft one end of which is connected with the engine by a fluid coupling, a power take-off shaft mounted in adjacent axial alinement with the opposite end of said driven shaft, and speed-variable power transmission means operating between said driven shaft and power take-off shaft, said means comprising planetary gearing and cooperating with said fluid coupling always automatically to adjust the power take-off to the correct engine speed and torque, said transmission means also comprising a drum concentrically surrounding said fluid driven shaft in a radially spaced relation thereto, said drum having internal gear teeth in mesh with said planetary gearing and having a tubular hub surrounding said sleeve shaft in a rotatable relation to the latter, a low gear drum surrounding said hub in a radially spaced relation thereto, a set of free wheeling rollers within said low gear drum in a surrounding relation to said hub so that said hub can rotate with said hub in one direction only, and manually controllable braking means for both of said drums.

5. In a hydraulic automatic differential gear transmission for self-propelled vehicles, a gear housing, an engine operable fluid driven shaft within said housing, said shaft having an end portion directed toward and adjacent to the engine, an engine driven sleeve shaft surrounding only that end portion of said fluid driven shaft which is adjacent to the engine, a planetary gear carrier concentrically secured to said fluid driven shaft beyond the part thereof which is surrounded by said sleeve shaft, a plurality of planetary gear shafts mounted upon said gear carrier in a rotatable relation thereto, axially alined driving planetary gears fixed to each of said planetary gear shafts and spaced apart therealong, a driven planetary gear fixed to each of said planetary gear shafts nearer to the engine than said driving planetary gears, a sun gear secured to said sleeve shaft and in mesh with said driven planetary gears, an outer drum concentrically surrounding said mounting shaft in a normally rotatable relation thereto, said drum having internal gear teeth in mesh with one of the sets of driving planetary gears, foot operable braking means operatively connected with said drum, a power take-off shaft rotatably supported by said housing adjacent to and axially alined with that end portion of said fluid driven shaft which is farthest from the engine, an inner internally gear toothed drum contained loosely within said outer drum and secured concentrically to said power take-off shaft, the teeth of said inner drum being in mesh with another set of said planetary driving gears, the latter planetary driving gears being of greater diameter than the first set of planetary driving gears, so that braking said outer drum against rotation puts the engine into reverse gear.

6. In a hydraulic automatic differential gear transmission for self-propelled vehicles, a gear housing, an engine operable fluid driven shaft within said housing, said shaft having an end portion directed toward and adjacent to the engine, an engine driven sleeve shaft surrounding only that end portion of said fluid driven shaft which is adjacent to the engine, a planetary gear carrier concentrically secured to said fluid driven shaft beyond the part thereof which is surrounded by said sleeve shaft, a plurality of planetary gear shafts mounted upon said gear carrier in a rotatable relation thereto, axially alined driving planetary gears fixed to each of said planetary gear shafts and spaced apart therealong, a driven planetary gear fixed to each of said planetary gear shafts nearer to the engine than said driving planetary gears, a sun gear secured to said sleeve shaft and in mesh with said driven planetary gears, a normally rotatable first drum concentrically surrounding the side of the driving planetary gears nearest to said sun gear, said drum having internal gear teeth in mesh with said set of driving planetary gears, foot operable braking means operatively connected with said first drum, a power take-off shaft rotatably supported by said housing adjacent to and axially in line with that end portion of said fluid driven shaft which is farthest from said engine, a second internally toothed ring gear drum concentrically secured to said power take off shaft, the teeth of the latter drum being in mesh with the set of said planetary driving gears which is farthest from said sun gear, the teeth of the first set of planetary driving gears being of greater diameter than the teeth of said second set of planetary driving gears.

7. The subject matter of claim 6, and the first said drum having a hub portion concentrically surrounding said sleeve shaft, a free wheeling device in a surrounding operative relation to said hub, and foot operable braking means in an operative relation to said free wheeling device.

WILLIAM M. SUBLETTE.

REFERENCES CITED

The following references are of record in the file of this patent:

UNITED STATES PATENTS

| Number | Name | Date |
| --- | --- | --- |
| 2,135,246 | Yoxall | Nov. 1, 1938 |
| 2,206,859 | Duffield | July 2, 1940 |
| 2,277,214 | Dodge | Mar. 24, 1942 |
| 2,280,015 | Tipton | Apr. 14, 1942 |
| 2,324,713 | McFarland | July 20, 1943 |
| 2,371,574 | Swennes | Mar. 13, 1945 |
| 2,408,008 | Tipton | Sept. 24, 1946 |